M. T. SMITH.
Plow-Fender.
No. 59,468.
Patented Nov. 6, 1866.
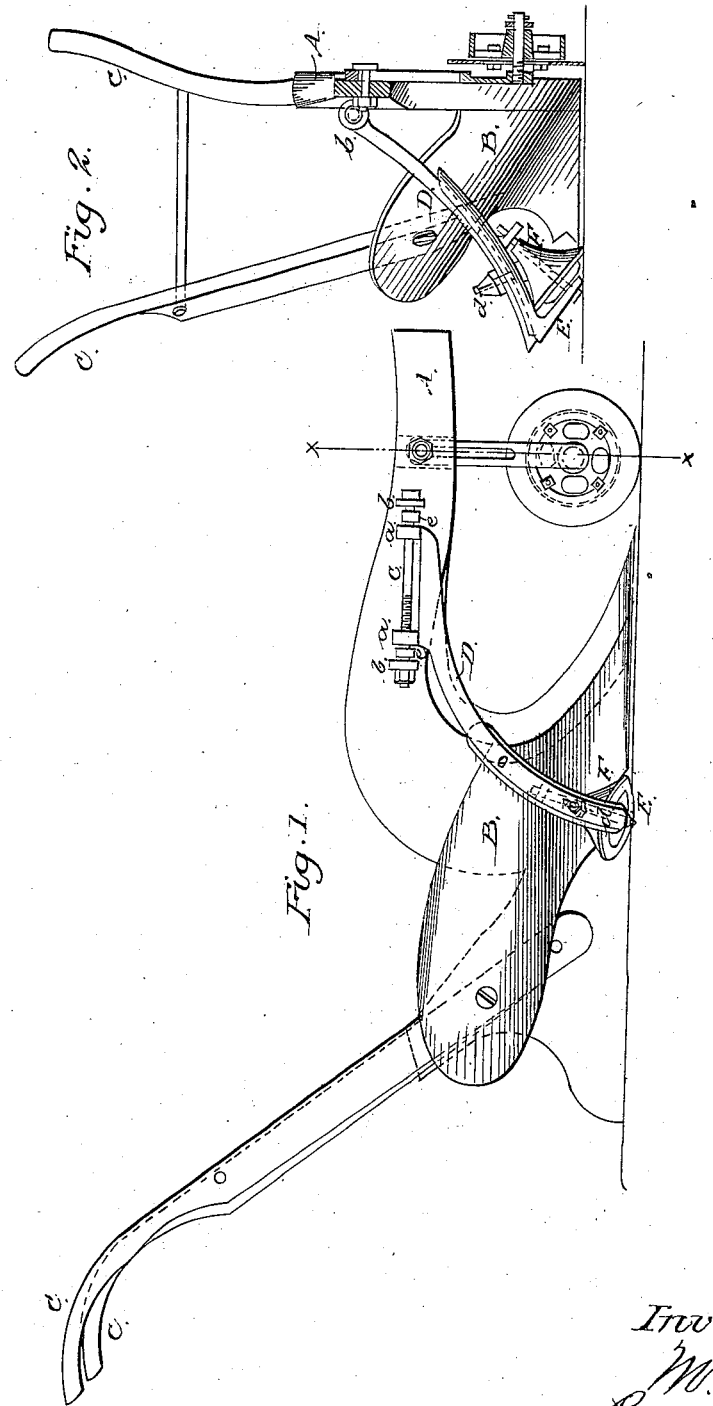
Witnesses:
F. A. Jackson
W. Treuin
Inventor:
M. T. Smith
Per Munn & Co
Attorney

UNITED STATES PATENT OFFICE.

M. T. SMITH, OF KEELER, MICHIGAN.

IMPROVEMENT IN PLOWS.

Specification forming part of Letters Patent No. 59,468, dated November 6, 1866.

*To all whom it may concern:*

Be it known that I, M. T. SMITH, of Keeler, in the county of Van Buren and State of Michigan, have invented a new and useful Weed and Grass Covering Attachment for Plows; and I do hereby declare that the following is a full, clear, and exact description thereof, which will enable others skilled in the art to make and use the same, reference being had to the accompanying drawings, forming part of this specification, in which—

Figure 1 is a side view of a plow having my improvement applied to it; Fig. 2, a transverse vertical section of the same, taken in the line $x\ x$, Fig. 1.

Similar letters of reference indicate like parts.

This invention relates to a new and improved attachment for plows; and has for its object the complete covering of all grass and weeds in the plowing of land.

The invention consists in applying a roller of concave taper form to an arm which is attached to the plow-beam, the parts being arranged as hereinafter fully shown and described, whereby the desired end is attained.

A represents the beam of a plow, and B the mold-board thereof, C C being the handles. These parts may be all constructed in the usual manner, and therefore do not require a minute description.

D represents a curved metal bar, one end of which is formed with two ears or projection, $a\ a$, through which and similar ears or projections $b\ b$ on one side of the plow-beam A a rod, $c$, passes, said rod and ears or projections constituting a joint, by which the bar D is attached to the beam. The lower or rear end of the bar D has a sliding or adjustable angle-bar, E, attached to it by a bolt, $d$, said bolt passing through an oblong slot, $d'$, in E. This angle-bar E has a concave taper roller, F, attached to it, which is directly over the rear end of the share, and on account of the bar D being attached to the beam by a joint, said roller is allowed to rise and fall freely.

As the plow is drawn along, the furrow-slice cut and raised by the share and mold-board passes between the mold-board and roller, and the latter gathers or tucks under weeds and grass, causing the same to be entirely covered as the furrow-slice is turned and made to lap over or against the slice previously made. Thus, by this simple attachment, weedy or grassy ground may be plowed and all the weeds and grass covered.

On the rod $c$ loose washers $e$ may be fitted in order to admit of the bar D being adjusted farther forward or backward, as may be desired; and the roller F may be adjusted farther inward or outward on bar D by means of the bolt $d$ and oblong slot $d'$, admitting of the adjustment of the angle-bar E. Thus it will be seen that the roller may be adjusted to suit any width or depth of furrow.

Having thus described my invention, I claim as new and desire to secure by Letters Patent—

The roller F and bar D, connected together and applied to the plow-beam A, to operate in the manner substantially as and for the purpose herein set forth.

M. T. SMITH.

Witnesses:
A. W. S. HILL,
D. E. PLETSHER.